Nov. 20, 1923.
J. P. JERGESEN
TRACTOR ATTACHMENT
Filed Aug. 29, 1922
1,475,069
4 Sheets-Sheet 1
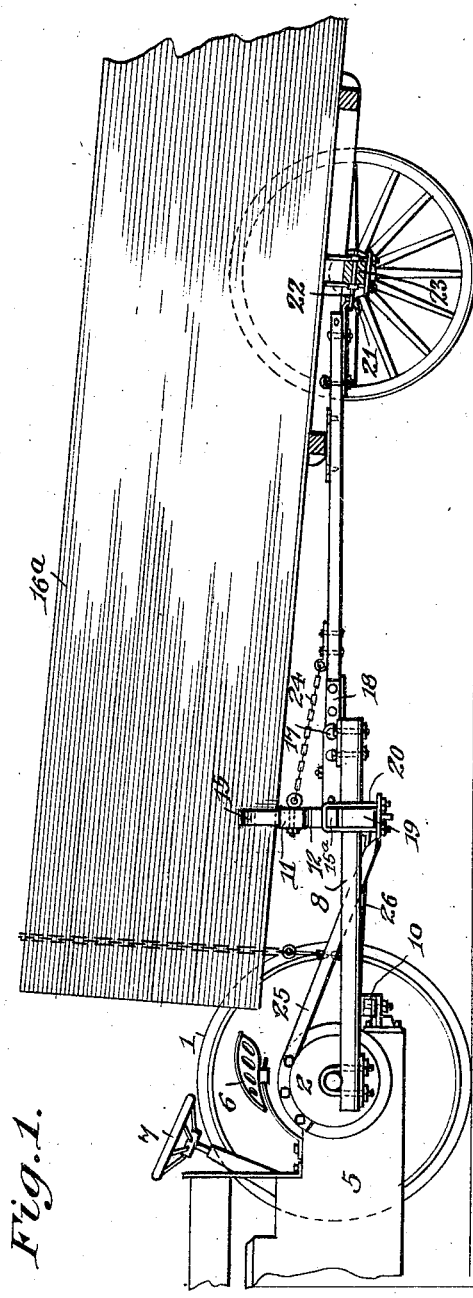
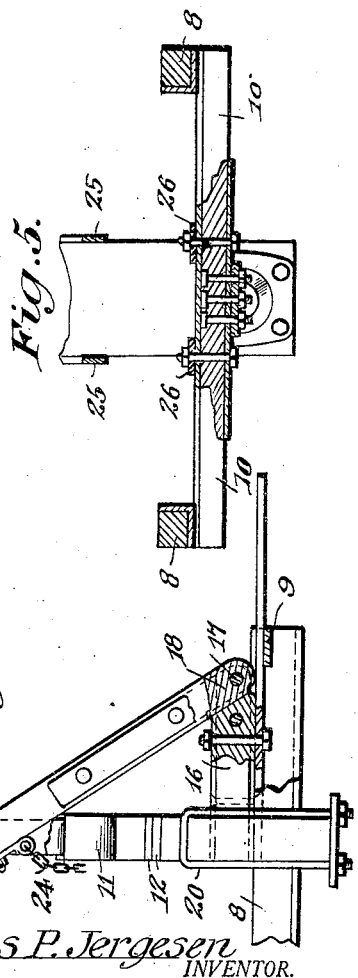
James P. Jergesen
INVENTOR.
BY Geo. Kimmel
ATTORNEY.

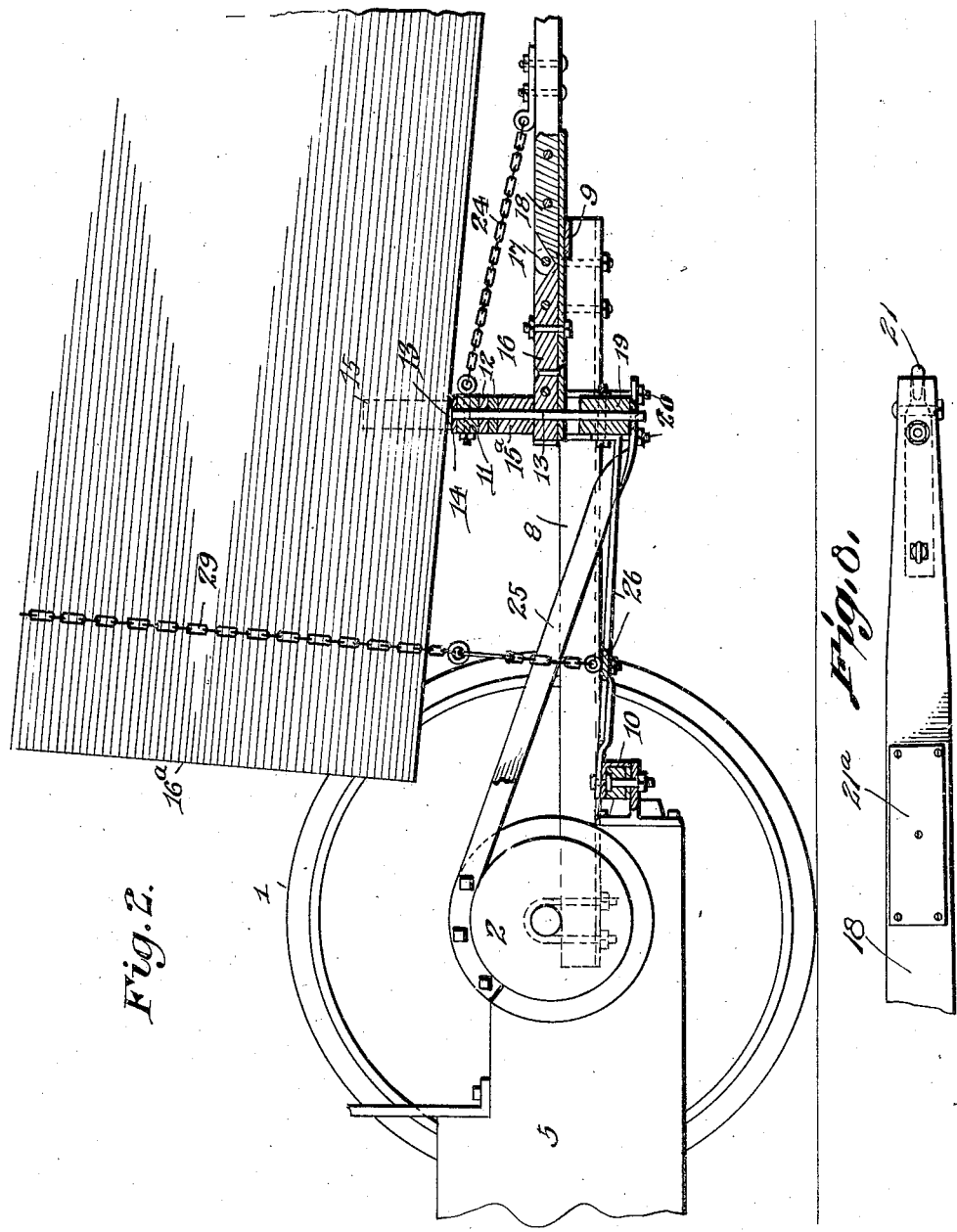

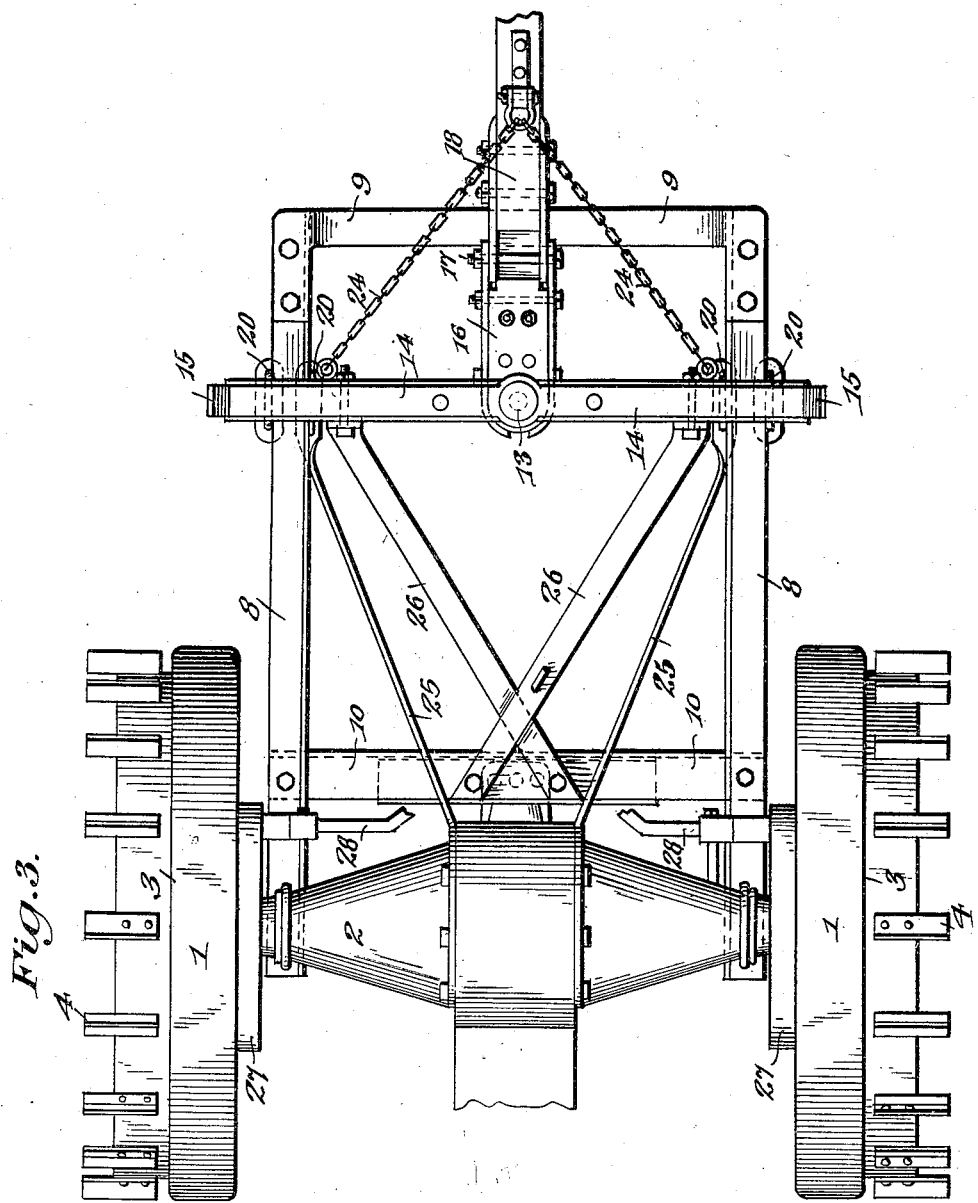

Nov. 20, 1923.  1,475,069

J. P. JERGESEN

TRACTOR ATTACHMENT

Filed Aug. 29, 1922   4 Sheets-Sheet 4

James P. Jergesen, INVENTOR.

BY Geo. P. Kimmel
ATTORNEY.

Patented Nov. 20, 1923.

1,475,069

UNITED STATES PATENT OFFICE.

JAMES P. JERGESEN, OF BUFFALO, NEW YORK, ASSIGNOR TO MELDRUM MOTOR CORPORATION, OF BUFFALO, NEW YORK.

TRACTOR ATTACHMENT.

Application filed August 29, 1922. Serial No. 584,993.

*To all whom it may concern:*

Be it known that I, JAMES P. JERGESEN, a citizen of the United States, and a resident of city of Buffalo, in the county of Erie and State of New York, have invented certain new and useful Improvements in Tractor Attachments, of which the following is a specification.

This invention has reference to tractor haulage for lumber and its object is to adapt tractors of small size for hauling purposes in lumber yards, the invention having particular reference to the utilization and adaptation of the Fordson type of tractor for such purpose.

Heretofore lumber has been handled in some of the larger lumber yards by means of a two wheeled truck drawn by horses and the lumber has been moved from place to place on such a truck with the motive power in the form of horses.

In more recent years, the gasoline tractor has largely taken the place of horses, but the smaller type of tractors has not been adapted for the purposes of the invention which is the handling of lumber.

It is the object of this invention to devise means whereby the Fordson tractor may be utilized for handling lumber with facility. In order to accomplish this purpose, it has been necessary to modify certain parts of the Fordson tractor to permit the loading and transportation of lumber therewith.

The general type of tractor to which the invention relates follows the lines of the commercial tractor, including the drive wheels and drive axle, the engine and the front or steering truck.

The rear end of the tractor is modified to adapt it to the purposes of the invention and it is to this part of the tractor that the invention relates particularly, so that the tractor will accommodate a large load of lumber and maintain its equilibrium when moving over the ground with the load suitably distributed both laterally and longitudinally so that the loaded vehicle will have a minimum tendency to upset.

The invention will be best understood from a consideration of the following detailed description taken in connection with the accompanying drawings forming a part of this specification, with the understanding however that the invention is not confined to any strict conformity with the showing of the drawings, but may be changed and modified so long as such changes and modifications mark no material departure from the salient features of the invention as expressed in the appended claims.

In the drawings:—

Figure 1 is a side elevation, with some parts in longitudinal section showing the rear portion of a tractor having an extension for connection of the tractor to a rear truck for sustaining the load.

Fig. 2 is a side elevation of the front end of the device with some parts in longitudinal section showing structures similar to Fig. 1 and drawn on a larger scale.

Fig. 3 is a view similar to Fig. 2 and on a similar scale showing a plan view of the rear or driving portion of the tractor and the rear attachment therefor.

Figs. 5, 6 and 7 are detail views of the tractor attachment.

Figure 8 is a fragmentary view, in plan, of the reach illustrating the rear portion thereof.

Figure 4:
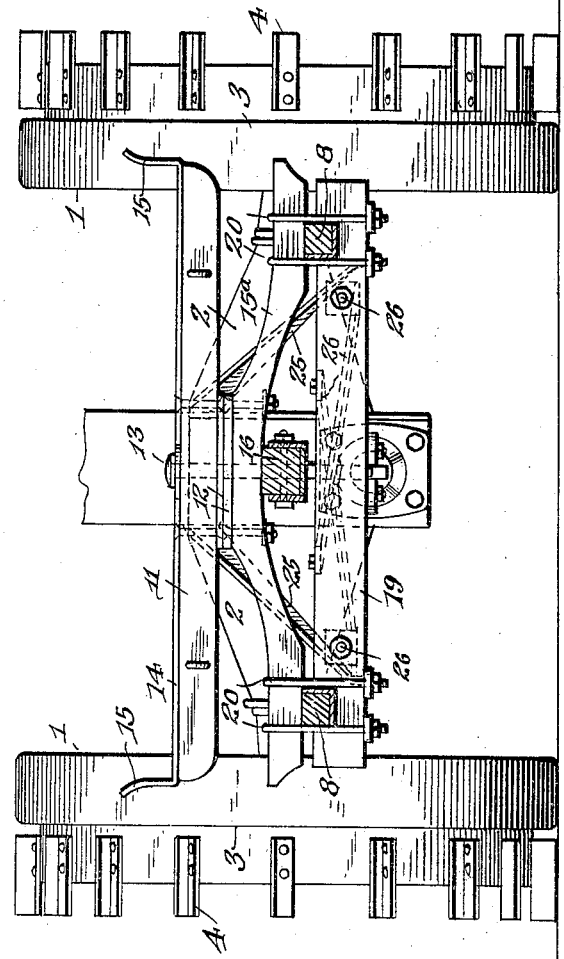
Fig. 4 is a cross section of the rear extension of the tractor and omitting the load.
Figure 7:

Referring to the drawings, there is shown a tractor provided with driving wheels 1 mounted on a rear axle structure 2 and provided with tires 3 and tractor blades 4, while other parts of the tractor structure are omitted from the drawings as being of ordinary construction and therefore not shown. A portion of the body part of the tractor is indicated generally at 5 and the driver's seat 6 and the steering wheel 7 are also shown without any attempt to illustrate any special form thereof.

Mounted on the rear axle 2 is a frame composed of side sills 8 and transverse bars 9 and 10, respectively, the frame made up of the sills and cross bars being conveniently constructed of structural steel.

Between the cross bars 9 and 10 there is mounted a bolster 11 having a fifth wheel support 12 traversed by a king bolt 13. The bolster 11 is faced on the top by a plate 14 with upturned ends 15 so as to constitute a supporting wear surface for a load of lumber 16ª shown in Figs. 1 and 2.

Underlying the bolts 13 is a sand board 15 separated from the bolster by the plates or fifth wheel structure 12 with the several named parts traversed by the king bolt 13 and the king bolt also traverses the corresponding end of the reach 16 connected by a pivot pin 17 to the forward end of a reach beam 18 so that the reach member 18 may be tilted upwardly with respect to the forward reach member 16.

The sand board 15 is connected at the ends to a cross beam 19 by clips 20 in the form of U-bolts straddling the sills 8 so that the parts are all firmly united in a particularly rigid manner, while the reach section 16 which may be considered as a fixed member of the reach is firmly connected by bolts 20 thereto.

The rear member 18 of the reach terminates in a hook plate 21 capable of being turned upward about the pivot bolt 17 so as to upstand when the tractor is being moved from place to place and the load is not present.

The hook 21 is adapted to engage a coupling 22 on a truck structure 23 designed to carry the load 16ª of lumber.

The reach member 18 has secured to its upper face, a wear plate 21ª for the front bar of the rear, two wheeled, truck.

In order to couple the load sustaining truck or trailer to the bolster, there are provided chains 24, while braces 25 connect the axle housing 2 to the cross beam 19, and the beam 19 is also connected to the front cross bar 10 by hounds 26.

The tractor is further provided with brakes enclosed in housings 27 connected to the wheels 1 and these brakes are under the control of manipulating gearing shown in Fig. 3 at 28, but without any attempt to show any particular construction thereof, since such brakes constitute part of the equipment of the Fordson tractor.

Moreover, the lumber carrying truck is provided with a bull chain 29 whereby the lumber load is attached to the frame made up of the sides 8 and cross bars 9 and 10.

The invention is designed more particularly for adapting a Fordson or like tractor for use in lumber yards and the design of the tractor as modified for the purpose is directed to such use, but is not necessarily confined thereto.

The connection between the tractor and the bolster through the king bolt and reach is such that the range of swinging movement of the reach about the king bolt approximates 180 degrees.

What is claimed is:—

1. A power tractor provided with a frame constituting an attachment to the tractor and there rigidly supported so as to overhang the ground, a work supporting bolster carried by and forming part of the attachment, and a divided reach extending rearwardly from the tractor and foldable at the point of division about a horizontal pivot upwardly toward the tractor.

2. A power tractor provided with a frame constituting an attachment to the tractor and there rigidly supported so as to overhang the ground, a work supporting bolster carried by and forming part of the attachment, and a divided reach extending rearwardly from the tractor and foldable at the point of division about a horizontal pivot upwardly toward the tractor, the bolster and rearward extension of the reach having chain connections for sustaining it.

3. A power tractor provided with a frame constituting an attachment to the tractor and there rigidly supported so as to overhang the ground, a work supporting bolster carried by and forming part of the attachment, and a divided reach extending rearwardly from the tractor and foldable at the point of division about a horizontal pivot upwardly toward the tractor, the bolster and rearward extension of the reach having chain connections for sustaining it, and the rear end of the reach having a hook for connecting it to a lumber truck.

4. A power tractor provided with a frame constituting an attachment to the tractor and there rigidly supported so as to overhang the ground, a work supporting bolster carried by and forming part of the attachment, and a divided reach extending rearwardly from the tractor and foldable at the point of division about a horizontal pivot upwardly toward the tractor, the bolster and rearward extension of the reach having chain connections for sustaining it, and the rear end of the reach having a hook for connecting it to a lumber truck, the tractor and bolster together with the reach having a king bolt connection whereby the reach and bolster have a range of movement about an upright axis approximating 180 degrees.

In testimony whereof, I affix my signature hereto.

JAMES P. JERGESEN.